SEQUENTIAL TYPEWRITER MAGNETIC TAPE RECORDING AND CHECKING APPARATUS

Filed April 9, 1959 13 Sheets-Sheet 1

INVENTORS
LEON M. COOPER
DONALD E. SIMS

BY

Ralph C. Dustin
ATTORNEY

Dec. 24, 1963 L. M. COOPER ET AL 3,115,620

SEQUENTIAL TYPEWRITER MAGNETIC TAPE RECORDING AND CHECKING APPARATUS

Filed April 9, 1959 13 Sheets-Sheet 2

Dec. 24, 1963 L. M. COOPER ETAL 3,115,620

SEQUENTIAL TYPEWRITER MAGNETIC TAPE RECORDING AND CHECKING APPARATUS

Filed April 9, 1959 13 Sheets-Sheet 3

Dec. 24, 1963 L. M. COOPER ETAL 3,115,620

SEQUENTIAL TYPEWRITER MAGNETIC TAPE RECORDING AND CHECKING APPARATUS

Filed April 9, 1959 13 Sheets-Sheet 4

Dec. 24, 1963 L. M. COOPER ETAL 3,115,620

SEQUENTIAL TYPEWRITER MAGNETIC TAPE RECORDING AND CHECKING APPARATUS

Filed April 9, 1959 13 Sheets-Sheet 5

| | R3 | R4 | R5 | R6 | R7 | R8 | R9 |
|---|---|---|---|---|---|---|---|
| A | | | X | | | X | X |
| B | | X | | | X | | X |
| C | X | | | | X | | X |
| D | | | X | | X | | X |
| E | X | | X | | X | X | X |
| F | | X | | X | X | | |
| G | X | | | X | X | | |
| H | | X | | X | X | X | X |
| I | | | | | X | X | X |
| J | X | | | X | | X | |
| K | | X | | X | | X | |
| L | X | X | | X | | X | X |
| M | | X | | X | | | X |
| N | | X | X | X | X | | X |
| O | | X | X | X | | | |
| P | X | X | | X | | | |
| Q | X | | | X | | | X |
| R | X | X | | X | X | | X |
| S | | X | X | X | X | X | |
| T | | | X | X | | X | |
| U | X | | | | | X | X |
| V | | X | | | | X | X |
| W | X | X | | | | | X |
| X | X | | | X | X | X | X |
| Y | | X | X | X | | X | X |
| Z | X | X | | X | X | X | |

| | R3 | R4 | R5 | R6 | R7 | R8 | R9 |
|---|---|---|---|---|---|---|---|
| 1 | X | | X | | X | | |
| 2 | | X | X | | | X | |
| 3 | X | X | | | | X | |
| 4 | | | | X | X | | X |
| 5 | | | X | X | | | X |
| 6 | X | X | | | X | | |
| 7 | | | | X | | X | X |
| 8 | | | | X | X | X | |
| 9 | | X | X | | X | | |
| 0 | | X | X | | | | X |
| TAB | X | | | | | | |
| CR | | | | X | | | |
| SPC | | | | | | X | |
| BSP | | | | | X | | |
| ÷ | | | X | X | X | X | X |
| ▪ | | | X | X | X | | |
| ' | | X | X | | X | X | X |
| ; | X | X | X | | | X | X |
| - | X | X | | | X | X | X |
| , | X | | | | X | X | |
| . | | X | | | X | X | |
| / | X | X | X | | X | | X |

FIG. 7

Dec. 24, 1963 L. M. COOPER ETAL 3,115,620
SEQUENTIAL TYPEWRITER MAGNETIC TAPE RECORDING AND CHECKING APPARATUS
Filed April 9, 1959 13 Sheets-Sheet 13

United States Patent Office 3,115,620
Patented Dec. 24, 1963

3,115,620

SEQUENTIAL TYPEWRITER MAGNETIC TAPE RECORDING AND CHECKING APPARATUS

Leon M. Cooper and Donald E. Sims, Lexington, Ky., assignors to International Business Machines Corporation, New York, N.Y., a corporation of New York Filed Apr. 9, 1959, Ser. No. 805,170
7 Claims. (Cl. 340—174.1)

This invention is directed to a mechanism associated with a typewriter for writing information on a magnetic tape simultaneously with the typing of the same information by the actuation of type bars, the mechanism then being operable to read the information from the tape and cause an operation of the typewriter to write the information.

It is usually necessary that an original and one or more copies of typed information be prepared, and it is desirable that each copy look like the original. By writing information on a magnetic tape simultaneously with the operation of a typewriter to write the same information on a sheet of paper, and then using the tape to operate the typewriter automatically, there may be obtained as many copies as desired by simply running the tape over and over, and each copy looks like the others. The tape may also be stored easily for use at a later date to prepare other copies. If many copies are needed at a point distant from that at which the tape is prepared, it may be easily mailed to the point where it is used to operate a typewriter.

When a typewriter is operated manually it sometimes happens that mistakes are made, and, even through typed information may be erased, it is usually noticeable on the sheet. The information typed on the paper while the tape is being prepared may be used only as a guide for the typist. If a wrong character is typed, the carriage may be backspaced and the correct key actuated to write the desired character over the one already written. During the writing of information on a magnetic tape, any information already in the space where a character is to be written may be erased magnetically as the writing of new information takes place. By feeding the tape backwardly one character position when the carriage is back spaced for error correction, the character in that space is erased and another character is written on the actuation of a type key. If it is desired to rewrite a portion of a letter or to update information on a typed sheet, that part of the recording on the tape may be rewritten while the typewriter is operated to write on any test sheet. The head and the mechanism for moving it relative to the tape may be used both for writing information on operation of the typewriter and for reading the information to operate the typewriter automatically.

An object of this invention is to provide an improved mechanism co-operating with a typewriter for writing on a magnetic tape the same information that is typed by the manual actuation of type keys.

Another object is to provide an improved mechanism for reading information from a magnetic tape and controlling the operation of a typewriter.

Yet another object is to provide an improved mechanism operating with a typewriter to write characters magnetically on a tape simultaneously with the actuation of type keys and to test each character written for accuracy.

Still another object is to provide in a mechanism which operates to write information on a magnetic tape simultaneously with the actuation of type keys, means for feeding the tape either forwardly or rearwardly one character position when the carriage of the typewriter is backspaced, the direction of feed depending on the position of a control switch.

Another object is to provide a typewriter having mechanisms associated therewith for writing information on magnetic tape simultaneously with the manual actuation of type keys, and for reading information from the tape and causing an operation of the typewriter to write the information read.

Other objects of the invention will be pointed out in the following description and claims and illustrated in the accompanying drawings, which disclose by way of example, the principle of the invention and the best mode, which has been contemplated, of applying that principle.

In the drawings:

FIG. 7 is a chart indicating the relays energized for each character and machine function.

Figures 11, 11A:
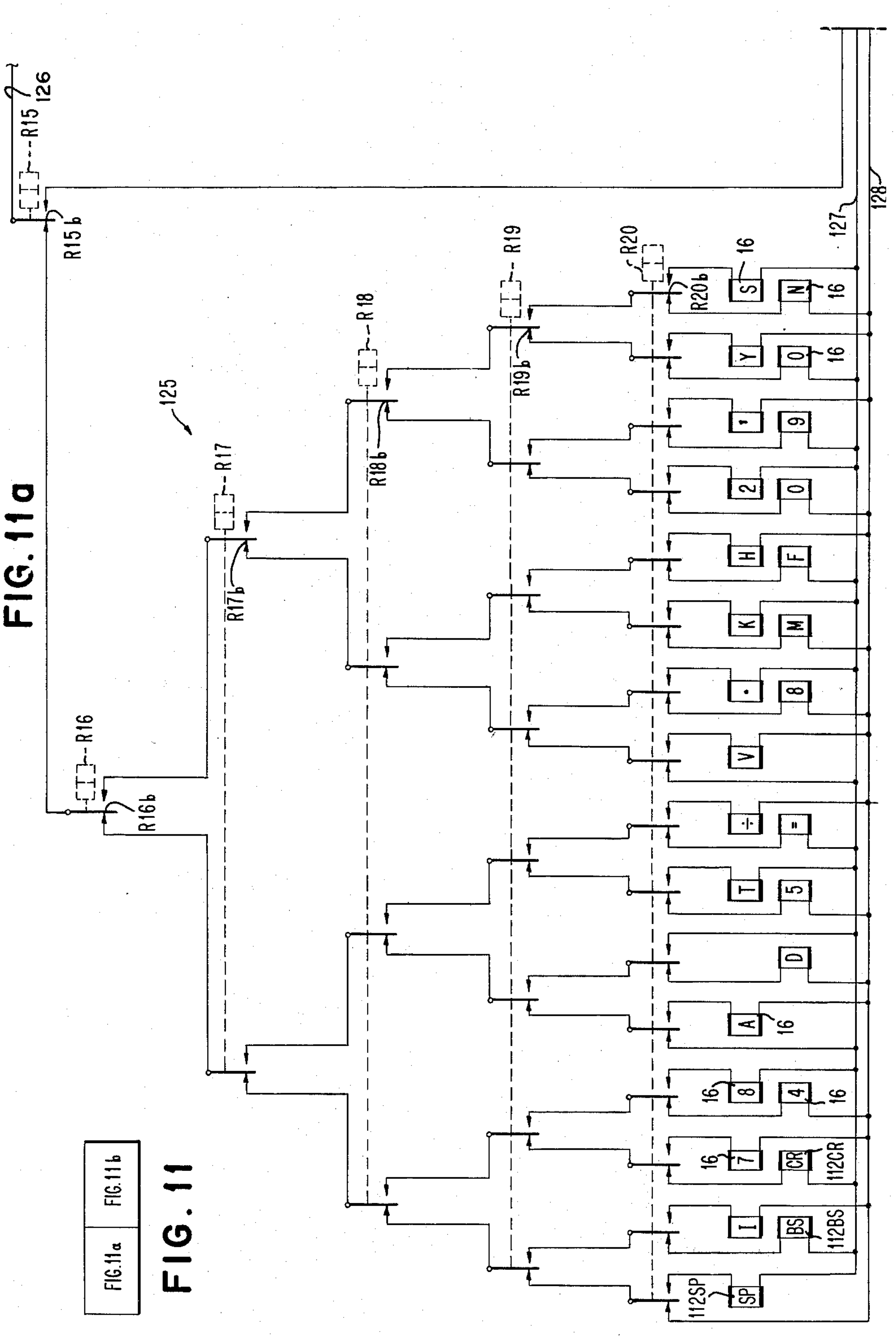
Figure 11B:
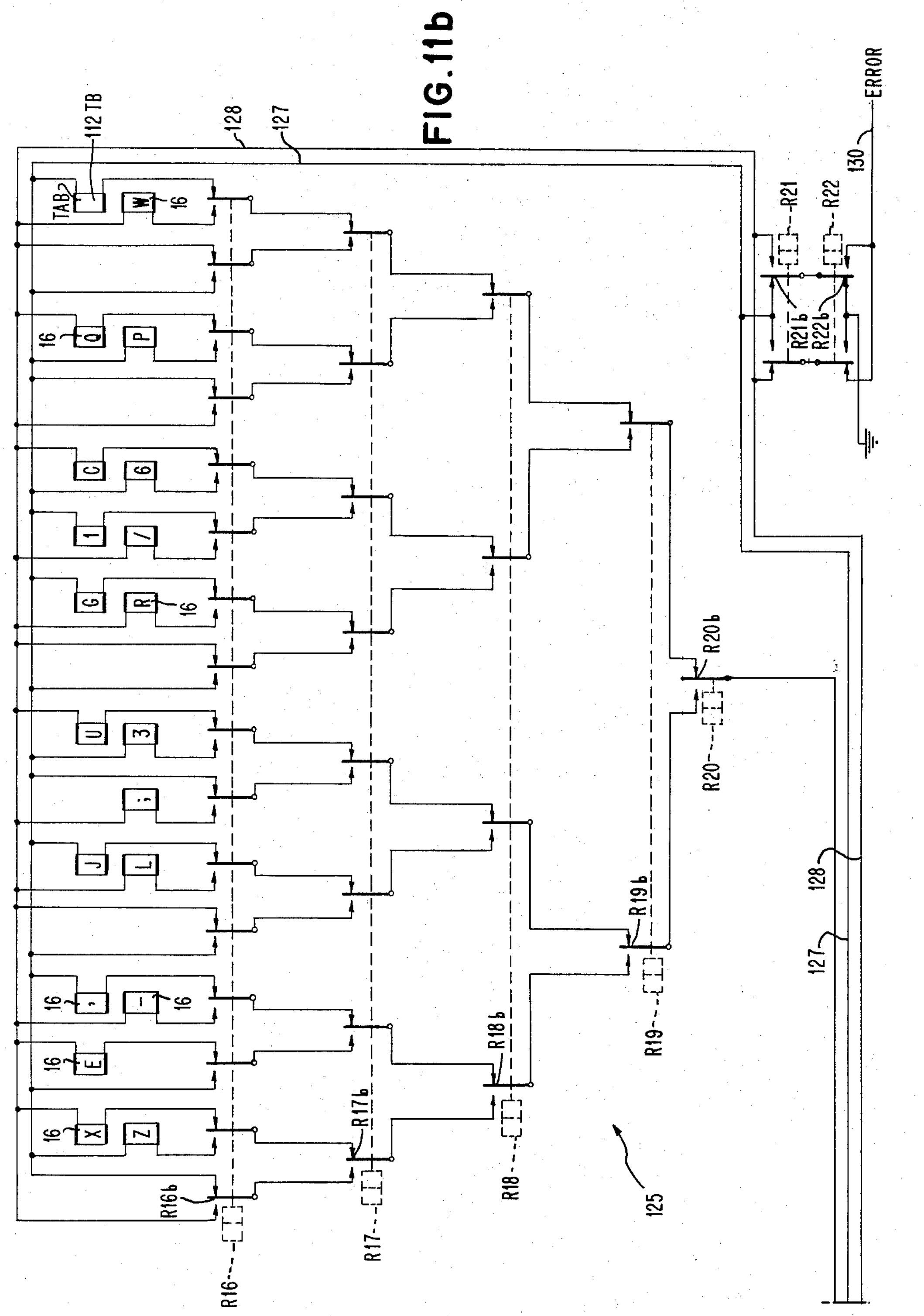

FIG. 11 indicates the arrangement of FIGS. 11*a* and 11*b* which together show a decode matrix for energizing magnets which operate type bars of the typewriter.

Figure 12:
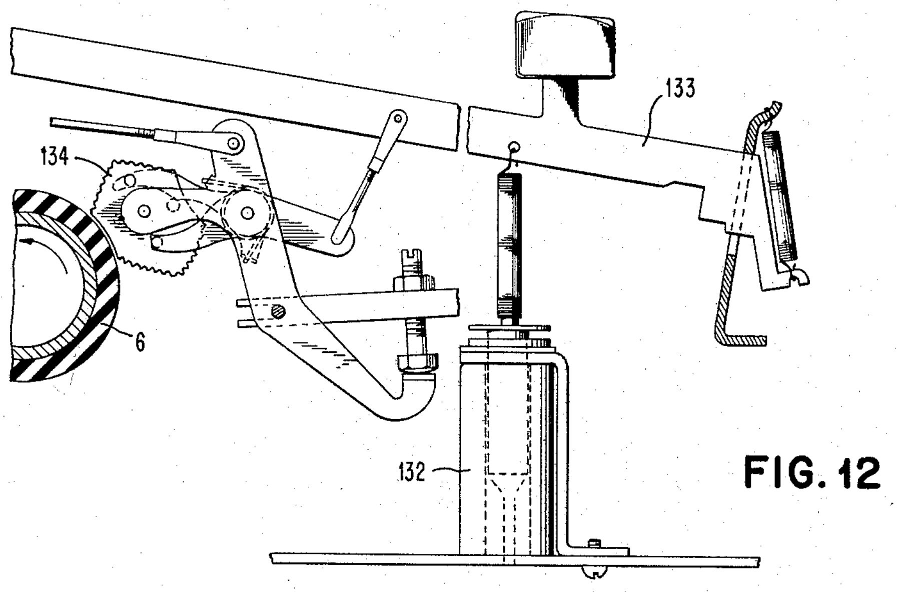

FIG. 12 shows a key lever mechanism operable to shift the type basket for writing either upper or lower case characters.

Figure 13:
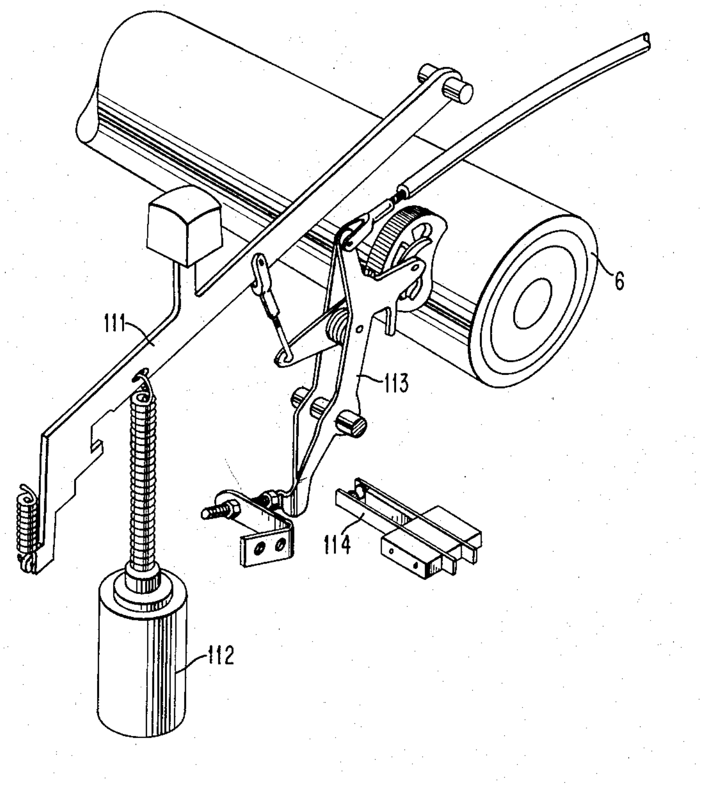

FIG. 13 shows one of various key lever mechanisms operable to effect various carriage functions.

Figures 1, 2:
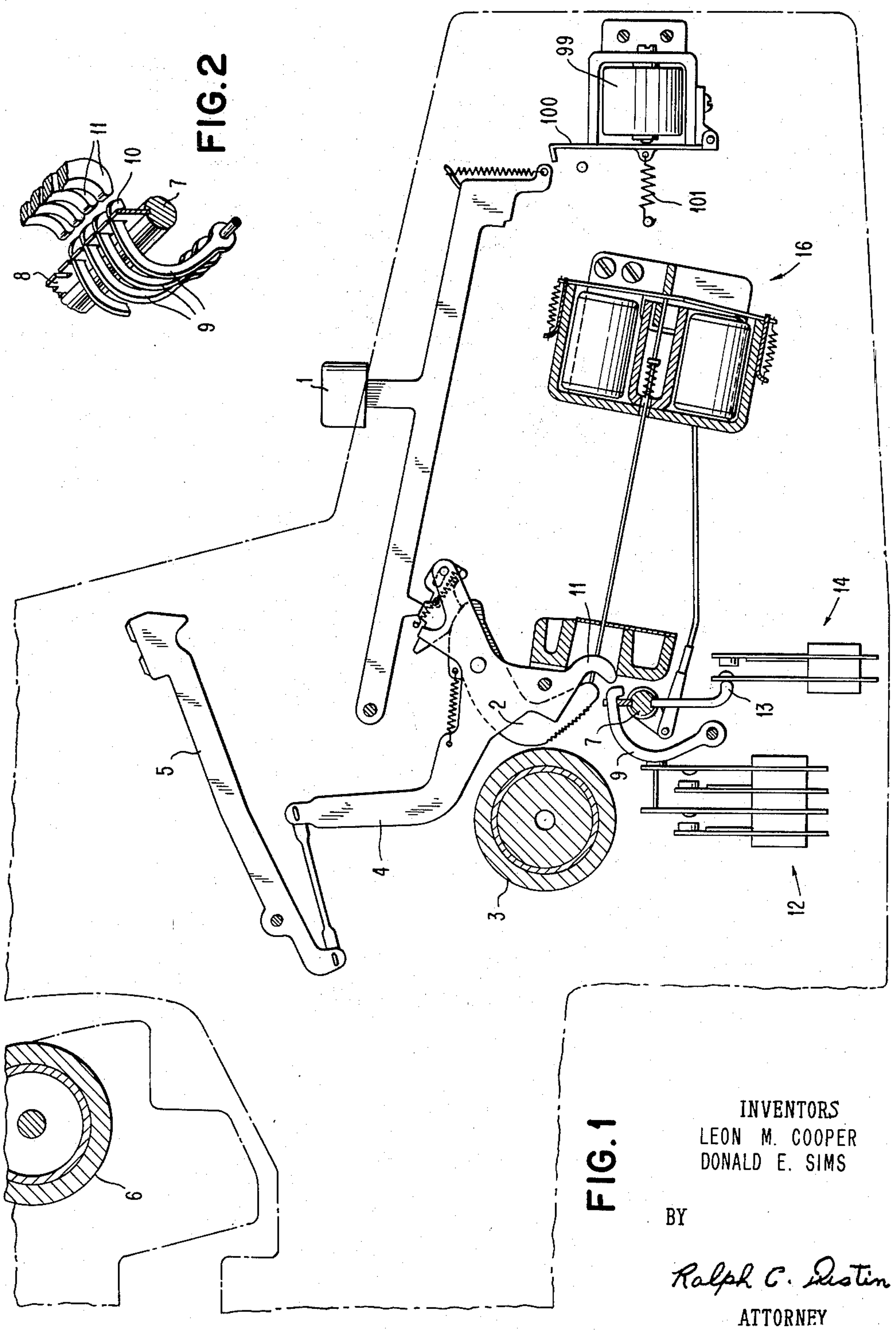
FIG. 1 is a side elevational view, partly in section, showing the mechanism for driving a type bar and having various switches and control means associated therewith.
FIG. 2 is an enlarged perspective view showing a portion of the switch actuating means in FIG. 1.

A typewriter which is suitable for use with mechanisms to write information on tape and then to operate automatically in response to the reading of the tape may be similar to that shown in the U.S. Patent 2,687,199 issued to K. S. Goodale et al. This includes, as shown in FIG. 1, a type key 1 which is operable to rock a cam 2 into engagement with a power roll 3 for driving a cam lever 4 to swing a type bar 5 against a platen 6. Extending parallel to the power roll, as shown in FIGS. 1 and 2, is a shaft 7 having a notched vane 8 fixed thereto. For each of the cam levers 4 there is provided a member 9 pivoted at its lower end and extending through one of the notches in the vane 8. The upper end of the member 9 is provided with a bent portion 10 lying between a tail portion 11 on its associated cam lever 4 and the vane 8. It will be seen that a rocking of the cam lever during a typing operation causes the tail portion 11 to rock the member 9 and the shaft 7 in a counter clockwise direction. The shaft 7 is rocked regardless of which type bar is actuated, but the member 9 rocked is the one associated with the particular type bar.

Arranged adjacent each of the members 9 are two pairs of contacts 12 which are normally open but are moved to closed positions when the member 9 is rocked. Fixed to the shaft 7 is an arm 13 which acts to close a pair of contacts 14 when the shaft is rocked. It will be seen that the contacts 14 will be closed each time that a character is typed, but the pairs of contacts 12 closed will be different for each character. Associated with the cam 2 is a magnet unit 16 which is operable when energized to move the cam into engagement with the power roll for effecting a driving of its type bar.

Figure 3:
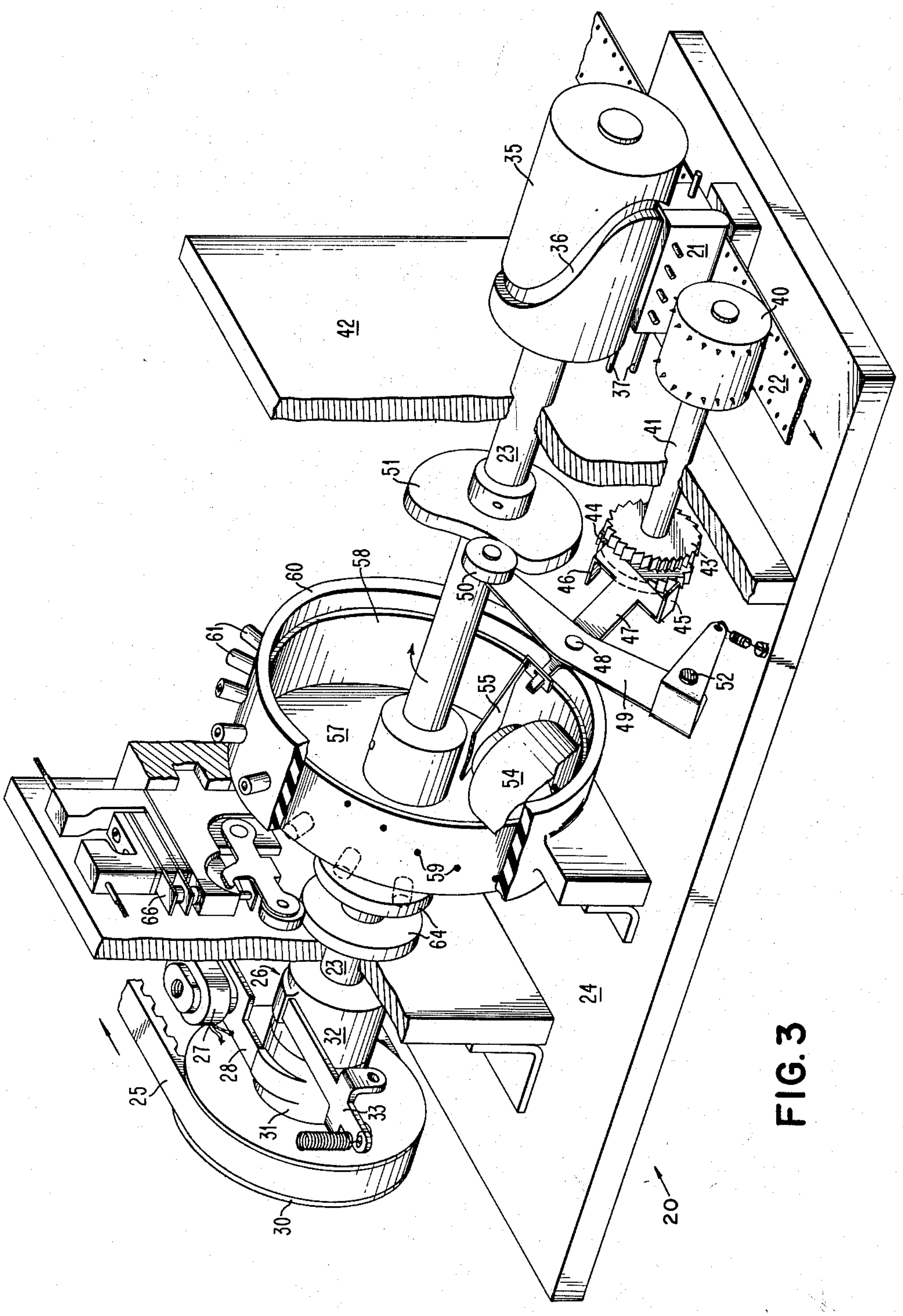
FIG. 3 is a perspective view of a mechanism for moving a magnetic head across a tape to read or write information thereon, and having tape feeding means, pulse generating devices, and various cam controlled switches associated therewith.

Located near the typewriter is a unit 20, FIG. 3, which is operable to move a magnetic head 21 across a tape 22 and back each time a type key 1 is actuated. This unit includes a shaft 23 rotatably supported on a base 24 and adapted to be driven one revolution by a continuously running belt 25 each time a clutch 26 is engaged by energizing a clutch magnet 27 to lift a control arm 28. The clutch 26 may comprise a helical spring surrounding one end of shaft 23 and a hub portion on a wheel 30 driven by the belt 25. The spring frictionally engages the hub portion and shaft 23 when released and tends to grip them tightly when its ends turn relative to each other on picking up the load on the shaft. Fixed to one end of the spring is a sleeve 31 loosely mounted on the hub of the wheel 30 and having a shoulder engageable by the arm 28. The other end of the clutch spring is attached to a sleeve 32 fixed on the shaft 23, and a shoulder on the sleeve 32 is engageable by a spring urged dog 33, as shown. With the arm 28 and the dog 33 engaging the shoulders, the clutch spring is held free of the wheel hub and the shaft 23. When the arm 28 is attracted by the magnet 27, the clutch spring locks the shaft 23 to the wheel 30 to be driven by the latter. If the magnet 27 is immediately de-energized, the arm 28 engages the shoulder on the sleeve 31 at the end of one revolution and holds one end of the clutch spring. The shaft 23 turns some due to inertia and causes the sleeve 32 to move to a position permitting the dog 33 to drop behind its shoulder. The clutch spring is unwound during this time and is held in such condition by the dog 33 and the arm 28.

At the opposite end of the shaft 23 is a drum 35 having a groove 36 receiving a projection on the magnetic head 21. As the drum is rotated, the groove 36 acts to reciprocate the head along rods 37 extending transversely of the magnetic tape 22. During one rotation of the drum, the head 21 will make one complete reciprocation across the tape.

Co-operating with the magnetic tape is a drum 40 having pins engaging holes in the tape for feeding the latter during rotation of the drum. A shaft 41 is rotatably supported by a plate 42 mounted on the base 24 and has the drum 40 fixed to one of its ends. Mounted on the opposite end of the shaft 41 are two ratchet wheels 43 and 44 which may be actuated selectively by bent portions 45, 46 on a member 47 pivotally connected at 48 to a lever 46 carrying a roller 50 which engages a cam 51 on the shaft 23. Rotation of the cam causes the lever 49 to swing about a pivot 52 and move the member 47 relative to the ratchet wheels. With the member 47 in the position shown in FIG. 3, its bent portion 46 acts on the ratchet wheel 44 to turn the latter in a clockwise direction one notch during one revolution of the shaft 23. Co-operating with each of the ratchet wheels is a ball detent 53 for holding the wheel in its different positions. At the upper end of the member 47 is a magnet 54 having an armature 55 which acts on a tail portion of the member 47 for swinging the latter in a counter clockwise direction when the magnet is energized. This positions the bent portion 45 over the ratchet wheel 43 and moves the portion 46 away from the wheel 44. Movement of the member 47 by a swinging of the lever 49 then causes the ratchet wheel 43 to turn one notch in a counter clockwise direction and rotate the drum 40 for feeding the magnetic tape in a reverse direction the distance of one character position. When the magnet 54 is de-energized, its armature 55 is moved by a spring 56 (FIG. 4) and acts on the member 47 to return it to a position where it actuates the ratchet 44.

Fixed to the shaft 23 is a disc 57 having at its outer periphery a rim 58 carrying slugs or elements 59 arranged in a helical path about its circumference. The slugs are made of a magnetic material while the rim 58 is made of a non-magnetic material. Surrounding the rim 58 is a cylindrical member 60 which is fixed by any suitable means to the base 24. Threaded into openings in the member 60 are magnetic emitters 61 arranged in a helical path like that in which the slugs 59 are arranged, but at a slightly different angle. The arrangement is such that each slug passes under one emitter located at a corresponding point in the path and causes a pulse to flow through the emitter while the slug passes under it. As described more in detail later, there are eight emitters, numbered 61–1 to 61–8, and eight slugs co-operating therewith in such a manner that the first slug passes under the emitter 61–1 when the shaft 23 has rotated approximately 72 degrees after engaging the clutch 26. As shown by the timing diagram of FIG. 8, the slugs pass consecutively under the emitters 61–1 to 61–8 at approximately 4 degree intervals.

Fixed to the shaft 23 are cams 64 operating contacts 66 at predetermined times during each cycle of operation. Only one set of contacts 66 has been shown in FIG. 3. Other sets of contacts 66 have been shown in the wiring diagram, FIG. 5, and the operation of these is indicated by the timing diagram, FIG. 8.

Figures 5, 5A:
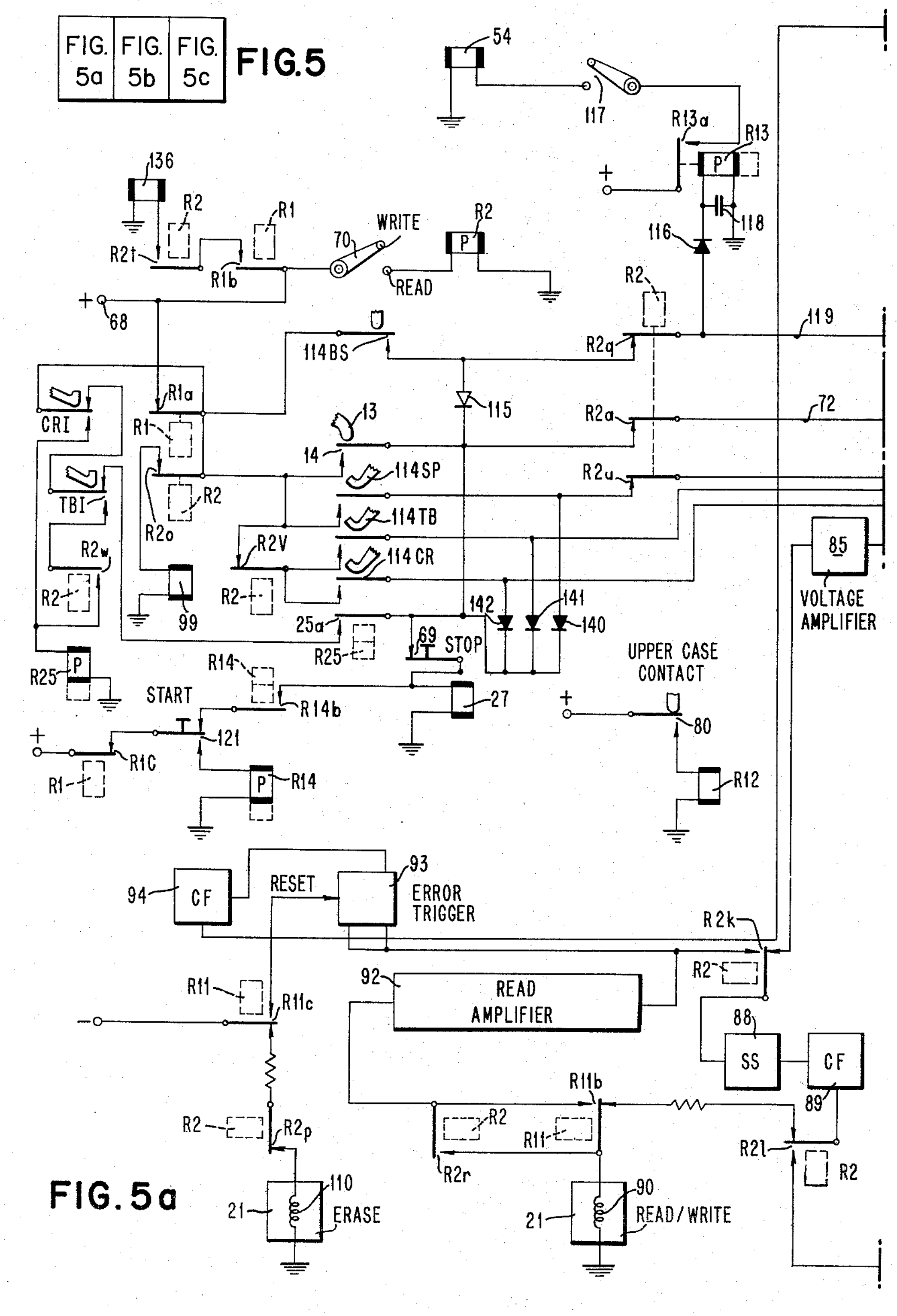
FIG. 5 shows the arrangement of FIGS. 5*a*, 5*b* and 5*c* which show together the circuits diagram.

There are shown in the wiring diagram various relays and electrical components which will be described in connection with the description of the different circuits. The positions of the contacts in FIG. 5 are those which exist at the beginning of a typing operation. On actuating any one of the type keys 1, the corresponding type bar 5 is caused to print and the contacts 14 are closed. It will be noted in FIG. 5*a* that this completes a circuit from the positive side of a power source 68 through relay contacts R1*a* of an error relay R1, the contacts 14, a stop switch 69 and the clutch magnet 27 to ground. This results in an operation of the clutch arm 28 to effect a driving of the shaft 23 through one revolution. Since a manually controlled switch 70 is in its open, or write, position in FIG. 5*a*, a relay R2 is de-energized and its contacts are in positions to effect a writing of the typed information on the magnetic tape. First, its contacts R2*a* are closed to complete circuits from the power source 68 through the contacts 14, the relay contacts R2*a*, an encode circuit (FIG. 5*b*) including the contacts 12 associated with the type bars, and some combination of relays R3 to R9 to ground at 71. The combination of relays energized is determined by the contacts 12 which are closed during the driving of the type bar 5. The two pairs of contacts 12 associated with each type bar have one contact of each pair connected to a conductor 72 leading from the contacts R2*a*. The other contact of each pair is connected as shown in FIG. 6 to the relays R3 to R9. Considering the contacts 12 for the bar typing the letter "A," it will be noted in FIG. 6 that a contact of one pair is connected through a conductor 73 to the relay R5. One contact of the other pair is connected through a conductor 74, a diode 75 and a conductor 76 to the relay R8. The conductor 74 is also connected through a diode 77 and a conductor 78 to the relay R9. It will be understood that during the typing of the letter "*a*," relays R5, R8 and R9 will be energized. In a similar manner, other combinations of relays will be energized during the typing of different characters. The combinations of relays energized for each of the characters is indicated by FIG. 7. An energizing of the relays R3 to R8 results in a closing of their corresponding contacts R3*a* to R8*a* (FIG. 5*b*), while an energizing of relay R9 results in a transfer of its contact R9*a* from a normally closed position to engage a normally open contact.

Relays R3 to R9 are energized in different combinations during the typing of lower case characters, and the combination energized is always odd. Associated with the relays R3 to R9 is a relay R10 which is energized only when typing upper case characters. Relay R10 is connected at one side to ground at 71 and is connected at its other side through relay contacts R2*b* (normally closed), relay contacts R11*a*, and relay contacts R12*a* (closed on shifting the type basket to upper case position) to the positive side of a power source. In order to maintain the contacts R12*a* closed while typing in upper case position, the relay R12 (FIG. 5*a*) is connected at one side to ground and is connected at its other side to a positive power source through contacts 80 which are closed when the type basket is moved to its upper case position. Incorporated in the typewriter of this application is a mechanism like that shown in the U.S. Patent 2,517,989 for shifting the type basket between upper and lower case positions. Description of this mechanism herein is believed to be unnecessary since it forms no part of the invention. One of the contacts 80 may be supported by the frame of the typewriter, while the other contact is fixed to the type basket so as to effect a closing of the circuit only when the basket is in upper case position.

With the relay R10 energized, its contacts R10*a* (FIG. 5*b*) are closed and its contact R10*b* is transferred from the normally closed position shown to engage a normally open contact. Transferring the contact R10*b* has the effect of either making or breaking a circuit through contact R9*a*. If the contact R9*a* remains in the position shown, then the energizing of relay R10 results in the completion of two circuits, one through contact R10*a* and the other through contacts R9*a* and R10*b*. If the contact R9*a* is transferred, then the energizing of relay R10 results in the closing of a circuit through contacts R10*a* and the breaking of a circuit which would otherwise have been closed through contact R9*a*. This assures that the number of circuits completed by the contacts R3*a* to R10*a* will be odd regardless of whether typing is being done in upper or lower case positions. If contact R9*a* is one of the contacts operated to complete an odd number of circuits in lower case position, then a shift to upper case position will result in a breaking of the circuit through contact R9*a* and a making of a circuit through R10*a* on typing the same character. When contact R9*a* is not included among those operated to complete an odd number of circuits in lower case position, then the upper case shift results in a closing of two more circuits to keep the number odd.

Each of the relay contacts R3*a* to R10*a* is connected through relay contacts R2*c* to R2*j* (normally closed) to the emitters 61 (FIG. 5*c*) which have been designated 61–1 to 61–8 in the order in which the slugs 59 pass under them to produce voltage pulses. The emitters are commercially available and each comprises a permanent magnet 81 surrounded by turns of a wire connected at one end to ground and connected at its other end through a voltage amplifier 82 and a diode 83 to the relay contacts as described above. The other side of the relay contacts R3*a* to R8*a* and R10*a* are connected to a common conductor 84 leading to a voltage amplifier 85. Relay contact R9*a* normally engages a contact connected by a conductor 86 to the normally open side of contact R10*b*, and the normally open side of contact R9*a* is connected by a conductor 87 through the normally closed side of contact R10*b* to the common conductor 84. The output side of the voltage amplifier 85 is connected through the normally closed side of relay contacts R2*k* to a single shot device 88 which applies a single pulse, for each input pulse, through a cathode follower 89, the normally closed side of contacts R2L, the normally closed side of contacts R11*b*, and a read-write winding 90 on the head 21 to ground.

Assuming that the type key for the letter "*a*" is actuated, the clutch magnet 27 is energized when the common contacts 14 are closed, and the relays R5, R8 and R9 are picked up to close their contacts R5*a*, R8*a* and R9*a*. Relays R3 to R9 are of the so-called latch-type, and are latched up until corresponding latch trip magnets L3 to L9 (FIG. 5*c*) are energized. With the clutch magnet energized, the shaft 23 is driven to rotate the slugs 59 under the emitters 61 and to move the head 21 across the magnetic tape 22. Since the relay contacts R5*a*, R8*a* and R9*a* are closed, pulses will be delivered from the emitters 61–3, 61–6 and 61–7 at corresponding times in the cycle to effect an energizing of the head winding 90. It will be understood that the head when energized, will be at different positions across the tape 22, these positions corresponding to the times at which pulses are produced by the emitters. An energizing of the winding 90 results in a magnetic mark on the tape. For the letter "*a*" there will be magnetic marks at positions 3, 6 and 7. If the type basket is shifted to upper case position, magnetic marks will be made on the tape 22 at positions 3, 6 and 8 to represent the letter "A." This is due to the fact that relay R10 will be energized and will close its contacts R10*a* to complete a circuit from emitter 61–8 to the write winding 90 while at the same time transferring its contacts R10*b* to open the circuit from the emitter 61–7.

Figure 8:
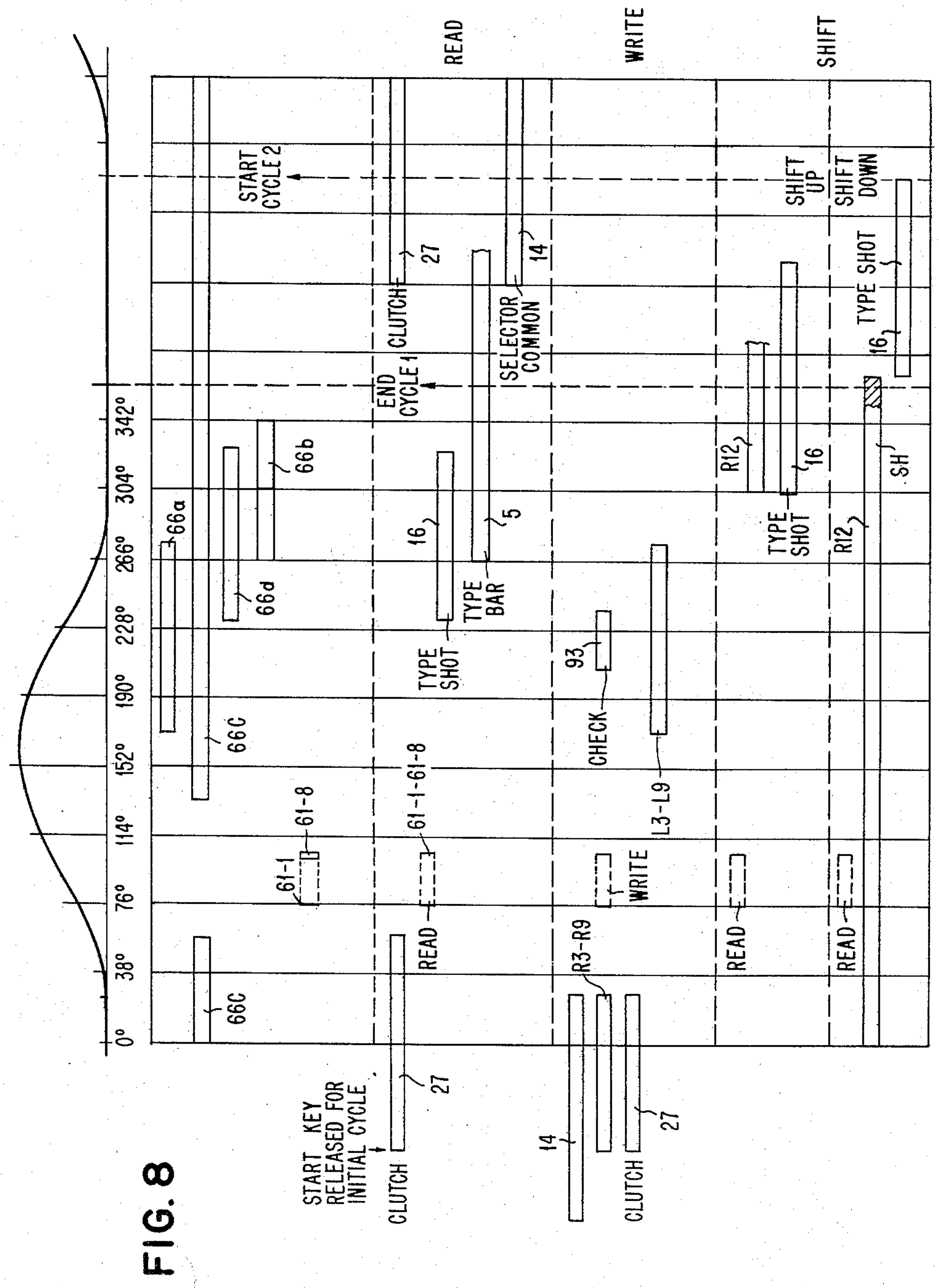
FIG. 8 is a timing diagram.

As soon as the head 21 has been moved across the tape in one direction, cam operated contacts 66*a* (FIG. 5*c*) close as indicated by the timing diagram, FIG. 8. These complete a circuit from the positive side of a voltage source at 91 through the relay R11 to ground. Contacts R11*b* (FIG. 5*a*) then transfer and complete a circuit from the head winding 90 through the contacts R11*b* (normally open) and an amplifier 92 to an error trigger 93 which is reset ON prior to a write operation. As the shaft 23 turns through the second half of its rotation, the head 21 is caused to move back across the tape 22 in the same path it followed while making the magnetic marks. Movement of the head over a magnetic mark causes a pulse to be induced in the winding 90 and delivered through the contacts R11*b* (normally open) to the amplifier 92. The output of the amplifier pulses the trigger 93 to switch it from its ON to its OFF state. If a character has been correctly written on the tape, an odd number of pulses will be delivered to the trigger so that it will be OFF after the last mark is sensed. The ON output of the trigger is connected through a cathode follower 94 and relay contacts R2*m* (normally closed) to one grid of a thyratron 95. Just as the head completes its return movement across the tape, cam contacts 66*b* (FIG. 5*c*) are closed by one of the cams 66 on the shaft 23 and complete a circuit from the source 91 through contacts R2*n* (normally closed) to a second grid of the thyratron 95. When a voltage is applied to both grids of the thyratron 95, a circuit is completed from a positive voltage source 96 through an error reset key 97, a resistor 98, the error relay R1 and the thyratron 95 to ground.

Assuming that an even number of pulses are produced by the sensing of magnetic marks during the return movement of the head, then the error trigger 93 is ON and a voltage is applied to a grid of the thyratron 95. The cam contacts 66b then close and place a voltage on the other grid of the thyratron making the latter conductive. This results in an energizing of the error relay R1 to open its contacts R1*a* (FIG. 5*a*) breaking the circuit between the voltage source 68 and the clutch 27 as well as the circuits between this same source and the relays R3 to R9. Another circuit extends from the voltage source 68 through contacts R1*a*, contacts R2*o* and a magnet 99 to ground. As shown in FIG. 1, the magnet 99 acts on a bail 100 extending along the ends of the key levers 1 and movable by a spring 101 under the key levers for locking the latter when the magnet is de-energized. The energizing of the error-relay R1 results, therefore, in the locking of the type keys by opening the contacts R1*a*. The thyratron 95 continues to conduct for rendering the system inoperative until the contacts 97 are actuated manually for opening the circuit through the error relay.

As mentioned above, the relays R3 to R9 are latched up when energized so their contacts remain in operated positions until the latch trip magnets L3 to L9 are energized. These relays have contacts R3*b* to R9*b* connected at one side to the latch trip magnets L3 to L9 respectively, and connected at their opposite sides to the cam contacts 66*a*. It will be noted that each of the latch trip magnets is connected at its opposite terminal to ground. With a closing of the cam contacts 66*a* when the head has completed its movement outwardly across the tape 22, as shown in FIG. 8, the latch trip magnets corresponding to the relays picked up are energized to effect a return of the relay contacts to normal positions.

Figure 9:
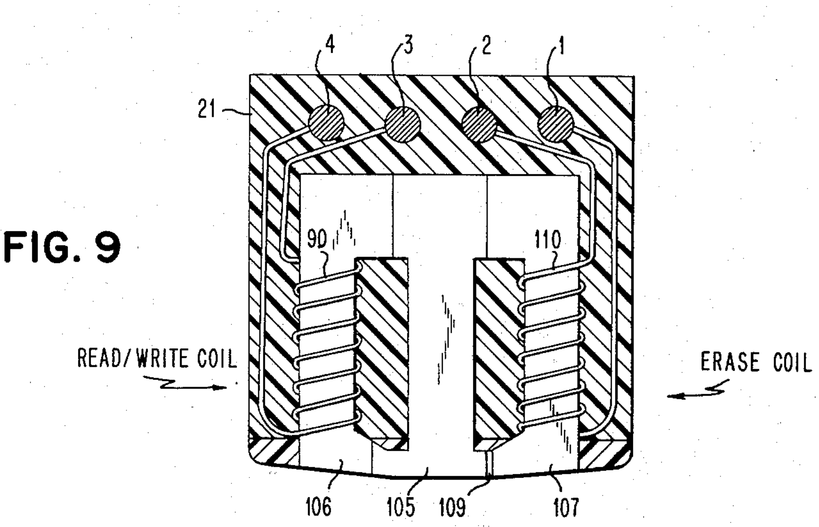
FIG. 9 is an enlarged sectional view of the magnetic head shown in FIG. 3.
Figure 10:
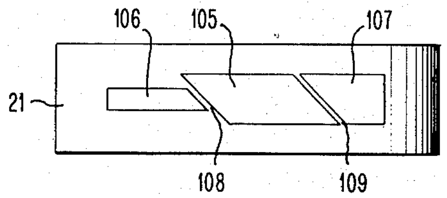
FIG. 10 is a view of the lower end of the head shown in FIG. 9.

As shown in FIG. 9, the magnetic head 21 comprises a central pole piece 105 and two side pole pieces 106 and 107. Between the central piece and the side pieces at their ends adjacent the tape 22, are air gaps 108 and 109. These gaps are arranged at approximately 45 degrees to the direction of movement by the head across the tape. This results in the writing of marks which may be sensed by movement of the head and the tape relative to each other in directions extending either longitudinally or transversely of the tape. The side pole piece 106 is somewhat thinner than the piece 107 so that the air gap 108 is shorter than the gap 109. The read-write winding 90 is arranged on the side piece 106 as shown, and an erase winding 110 is arranged on the side piece 107. While the head moves across the tape 22 during a writing operation (moving from left to right in FIG. 9), the erase gap 109 is in advance of the write gap 108. During this time, the erase winding 110 (FIG. 5*a*) is energized by a circuit extending from the negative side of a power source through relay contacts R11*c* (normally closed), contacts R2*p* and the erase winding to ground. Any magnetic marks previously made on the tape in the path of the head are erased at the gap 109 in advance of the gap 108 so that a clean tape surface is provided for the writing of information by pulsing the winding 90. Since the gap 109 is longer than gap 108, the written marks will lie within the cleaned path and no interference will be obtained from previously made marks while reading.

After the head has completed its movement across the tape during a write operation, the cam contacts 66*a* close and energize the relay R11, causing its contacts R11*c* to transfer and complete a circuit from the negative side of the power supply through relay contacts R11*c* (normally open) to the trigger 93. This places the trigger in condition to be switched by pulses delivered to it from the amplifier 92 as a result of reading the marks just written. It will be noted that the erase winding 110 is de-energized at this time due to the transfer of contacts R11*c*, and no erasing operation can take place while the head is moving to the left. When the head completes its movement to the left, the cam contacts 66*a* open and permit its contacts R11*c* to assume their normal position, opening the circuit to the trigger 93 and completing the circuit again through the erase winding. The opening of the trigger circuit results in a switching of the trigger, if OFF, to its ON state so it is ready to check the accuracy of the character written in the next character space on the tape.

When the head is returned to its starting position, the cam 51 normally operates the member 47 to turn the drum 40 for advancing the tape 22 to the next position at which a character is to be written. This operation takes place regardless of whether the head senses an odd number of marks (indicating a correctly written character) or an even number of marks (indicating an incorrect character). If the number of marks sensed is even, however, the keyboard locks up as mentioned above. It is then necessary that the contacts 97 be opened manually to break the circuit through the error relay R1 so that its contacts return to normal positions.

On the keyboard of the typewriter are several key levers which are operable to effect various functions by the typewriter carriage. Each of these key levers is like the key lever 111 shown in FIG. 13 and may be operated either manually or by a solenoid 112 to engage a cam with the power roll 6 for effecting a rocking motion of a cam frame 113. Arranged adjacent the lower end of the cam frame is a pair of contacts 114 which are closed momentarily during the rocking of the frame by the power roll. The reference numbers for the key levers 111 and the parts associated therewith will be used hereafter with letters designating the functions obtained.

A back space key lever 111BS is operable to effect a backspacing of the carriage one letter space. The mechanism actuated to produce a backspacing operation is like that shown in FIG. 4 of U.S. Patent 2,717,686 issued to R. R. Seeber, Jr. Back space contacts 114BS (FIGS. 5*a* and 13) are closed when the key lever is actuated and complete a circuit through a diode 115 to the clutch 27. Another circuit is completed from the contacts 114BS through relay contacts R2*q*, a diode 116 and the pick-up winding of a relay R13 to ground. The energizing of relay R13 causes its contacts R13*a* to close and complete a circuit from a positive power source through a manual switch 117 (closed) and the magnet 54 to ground. It will be remembered that magnet 54 operates as shown in FIG. 3 to position the member 47 for turning the feed drum 40 in a direction to move the tape backwardly one character space. The operation of the feed drum does not take place, however, until the head completes its reciprocation across the tape. When the clutch 27 is energized by an operation of the back space key, the head 21, being already advanced to the next character position, is moved across the tape one character space beyond the last written character and then the tape is moved backwardly to the line in which the error was detected. The typewriter key for the correct character is then actuated. This causes the head to move across the tape to erase the incorrect character marking and to write the character of the key last actuated. As the head is returned to its starting position, the magnetic marks are again sensed and the tape is advanced one space again.

When the backspace key on the typewriter is actuated to move the carriage back one space and to feed the tape 22 backwardly one character position, relay R7 is energized to cause the writing of a magnetic mark on the tape by the emitter 61–5. As indicated by FIG. 7, this is the code marking which causes a back-spacing operation of the typewriter when it is actuated by a reading of the tape in a manner to be described later. The circuit for energizing relay R7 extends from the voltage source 68 through the contacts 114BS when the back space key is actuated, through contacts R2*q*, a conductor 119, a diode 120, and the relay R7 to ground. During an operation for error correction, the head is first moved across the tape one character position beyond that in which the error was detected. This results in a marking of the tape by the emitter 61–5 and then a backward stepping of the tape to the position for correcting the character in which the error was sensed. When the character has been corrected, the tape is again stepped forwardly to the position where the back space mark was written. Any character key may now be actuated to effect a writing of a character, and, as this operation takes place, the back space mark is erased from the tape.

As described above, the magnet 54 is energized to cause a backstepping of the tape 22 one character position, and this is accomplished by closing the relay contacts R13*a*. Relay 13 is picked up by closing the contact 114BS during the actuation of a cam lever to effect backspacing of the typewriter carriage. A hold winding (FIG. 5*c*) for relay R13 is connected at one side to ground and is connected at its other side through its own contacts R13*b* and cam contacts 66*c* to the power source at 91. When relay R13 picks up, its contacts R13*b* close and energize the hold winding since the contacts 66*c* are closed at this time as shown by FIG. 8. Soon after this, however, the contacts 114BS open to break the circuit to the pick-up winding for relay R13, and the cam contacts 66*c* open to break the circuit through the hold winding. The cam contacts 66c close again a short time later. It is essential that the relay R13 be held up since the back stepping of the tape does not take place until the head is returned to its starting position, and the magnet 54 must be energized at that time. During the time that the cam contacts 66c are open, the pick-up winding for relay R13 is energized by a condenser 118 connected between its ends.

At times it is necessary to backspace the typewriter carriage for the purpose of adding something, such as underlining, to the characters already typed. In this case, it is necessary that the tape be marked to indicate backspacing and that the tape be then stepped ahead so it can have recorded upon it the character or symbol added after backspacing of the carriage takes place. To accomplish this, it is only necessary that the switch 117 be opened manually before the backspace key is actuated. This prevents an energizing of the magnet 54 which was operable to cause a reverse feeding of the tape.

After information has been written on the tape by the actuation of the typewriter keys, the marks on the tape may be read by the head 21 either to cause an energizing of one of the magnets 16 (FIG. 1) for actuating a type bar to print the character or to energize one of the solenoids 112 to obtain a function corresponding to the marks read. Assuming that the tape 22 has information recorded on it in the form of magnetic marks, and is in a position with the first character to be read in line with the head 21, the switch 70 is first moved manually to its read position for energizing the relay R2 and causing its contacts to move to positions opposite those shown in FIG. 5. This results in an opening of the relay contacts R2*a* to prevent an energizing of the relays R3 to R9, an opening of the contacts R2*o* to de-energize the magnet 99 for effecting a locking of the keyboard, and an opening of the contacts R2*p* to de-energize the erase winding 110 so no information is erased as the head is moved across the tape.

To start reading information, a start key 121 is operated to connect a positive voltage source through contacts R1*c* (normally closed) of the error relay and the pick-up winding of a start relay R14 to ground. A hold winding (FIG. 5*c*) for the relay R14 is connected at one side to ground, and is connected at its other side through its own contacts R14*a* to the cam contacts 66*c*. Since the cam contacts 66*c* are closed at the beginning of a cycle of operation, the hold winding for relay R14 is immediately energized to maintain its contacts in operated positions. When the start key 121 is released, it completes a circuit from the voltage source through the start key, relay contacts R14*b* and the clutch magnet 27 to ground. The shaft 23 is then driven to move the head 21 across the tape and back.

The winding 90 of the read-write head 21 is connected during this time, through relay contacts R2*r* (now closed), the amplifier 92, relay contacts R2*k* (normally open), the single shot device 88, the cathode follower 89 and the relay contacts R2L (normally open) to one grid in each of the thyratrons 123–1 to 123–8. Any magnetic mark sensed by the head 21 will cause a voltage to be induced in its winding 90, and this voltage is applied to the single shot 88 which applies a pulse to all of the thyratrons. A second grid in each of these thyratrons is connected during this time through the relay contacts R2*c* to R2*j* (normally open) to the emitters 61–1 to 61–8. As the slugs 59 pass serially under the emitters, voltage pulses are applied by the emitters to the second grid in each thyratron. If a magnetic mark is sensed by the head 21 on the tape 22, the first grid of each thyratron has a voltage applied to it, and the emitter in the position corresponding to that of the mark sensed applies a voltage to the second grid of the thyratron to which it is connected. This thyratron then becomes conductive and completes a circuit through the pickup winding of one of the relays R15 to R22 and the relay contacts R11*d* to a positive voltage source. As soon as one of these relays is picked up by the sensing of a magnetic mark, it is held up by the circuit established through the pick-up winding and the thyratron until the head has completed the reading portion of its travel. The energizing of the pick-up windings for relays R15 to R22 results in a closing of their contacts R15*a* to R22*a* (FIG. 5*c*) connected between cam contacts 66*c* and hold windings for the relays. The cam contacts 66*c* close soon after the head completes the reading portion of its travel and complete circuits through the hold windings R15 to R22 between the voltage supply 91 and ground. Shortly after the hold windings are energized, the cam contacts 66*a* close and energize the relay R11 so that its contacts R11*d* open and break any circuits existing through the thyratrons 123–1 to 123–8.

Referring to FIGS. 11*a* and 11*b*, it will be noted that contacts of relays R15 to R22 are connected in a decoding matrix, generally designated 125. The relay contacts are designated R15*b* to R22*b* on different levels of switching. When any one of the relays is energized, all of its contacts on the level in which it is connected are transferred. Input pulses are supplied to the matrix through a conductor 126 which is connected to the relay contacts R15b as shown. The normally closed side of contacts R15*b* is connected to contacts R16*b* at the peak of one pyramid of relay contacts, and the normally open side of contacts R15*b* is connected to contacts R20*b* at the peak of another pyramid which is inverted. It will be seen that the contacts at the peak of one pyramid form part of the relay having other contacts at the base of the other pyramid. By arranging the contacts in this manner, the maximum number of contacts required by any one relay is substantially reduced. The normally open and normally closed sides of the relay contacts at the base of each pyramid are connected through magnets 16 (FIG. 1) or solenoids 112 (FIG. 13) which are operable when energized to cause either an operation of a type bar 5 to print a character or some one of other typewriter functions which will be referred to later. The character printed or the function obtained is indicated on FIGS. 11*a* and 11*b*. The other sides of the magnets 16 and solenoids 112 are connected to one or the other of two common conductors 127 and 128. Relay contacts R21*b* and R22*b* are arranged to connect conductors 127 and 128 either to ground or to an error conductor 130. The arrangement is such that conductor 127 is normally connected to ground while conductor 128 is normally connected to the error conductor 130.

As described above, the writing of the letter "*a*" on the tape 22 is accomplished by making magnetic marks at positions 3, 6, and 7. When these marks are sensed during a read operation, pulses are produced to pick up relays R17, R20, and R21. Following through the matrix in FIG. 11 with relay contacts R17*b*, R20*b*, and R21*b* transferred, it will be noted that a pulse from the input line 126 will pass through contacts R15*b* (normally closed), R16*b* (normally closed), R17*b* (normally open), R18*b* (normally closed), R19*b* (normally closed), R20*b* (normally open) and the magnet 16 for the type bar printing the letter "A." The circuit is completed from the magnet 16 through the conductor 128, the relay contacts R21*b* (normally open) and contacts R22*b* (normally closed) to ground. The typewriter will be in lower case position at this time and the character "*a*" is printed. If it had been an upper case character such as "A" written on the tape, then magnetic marks would have existed at positions 3, 6, and 8. A reading of these marks would have picked up relays R17, R20 and R22. It will be noted that the relay contacts transferred at the input side of the magnet 16 is the same as it was before and so the circuit is completed again to conductor 128. At this time, however, conductor 128 is connected through contacts R21*b* (normally closed) and contacts R22*b* (normally open) to ground. The typewriter will have been shifted, as described later, to upper case position, and a printing of the character "A" will take place.

Figure 5B:
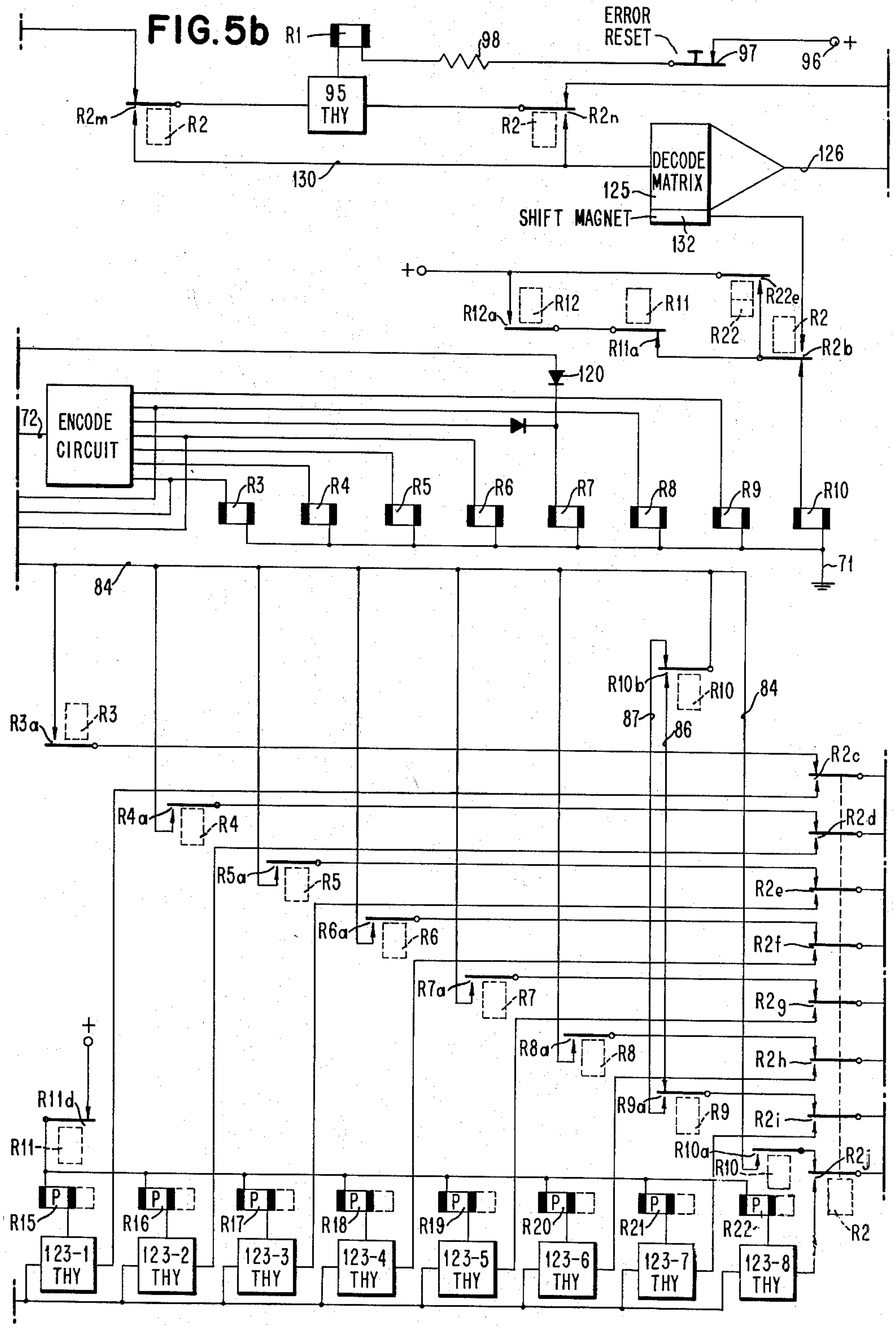
Figure 5C:
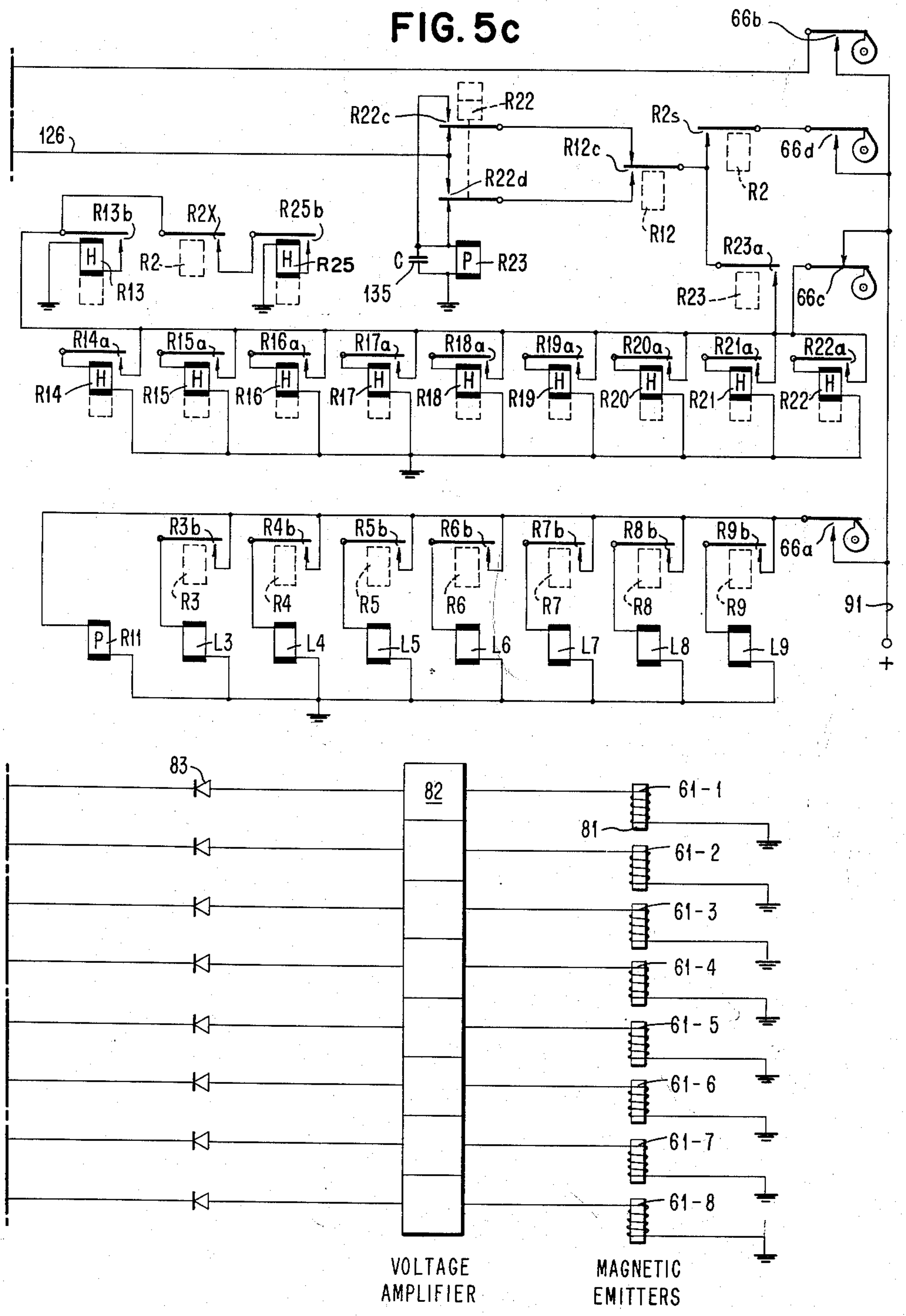
Figure 6:
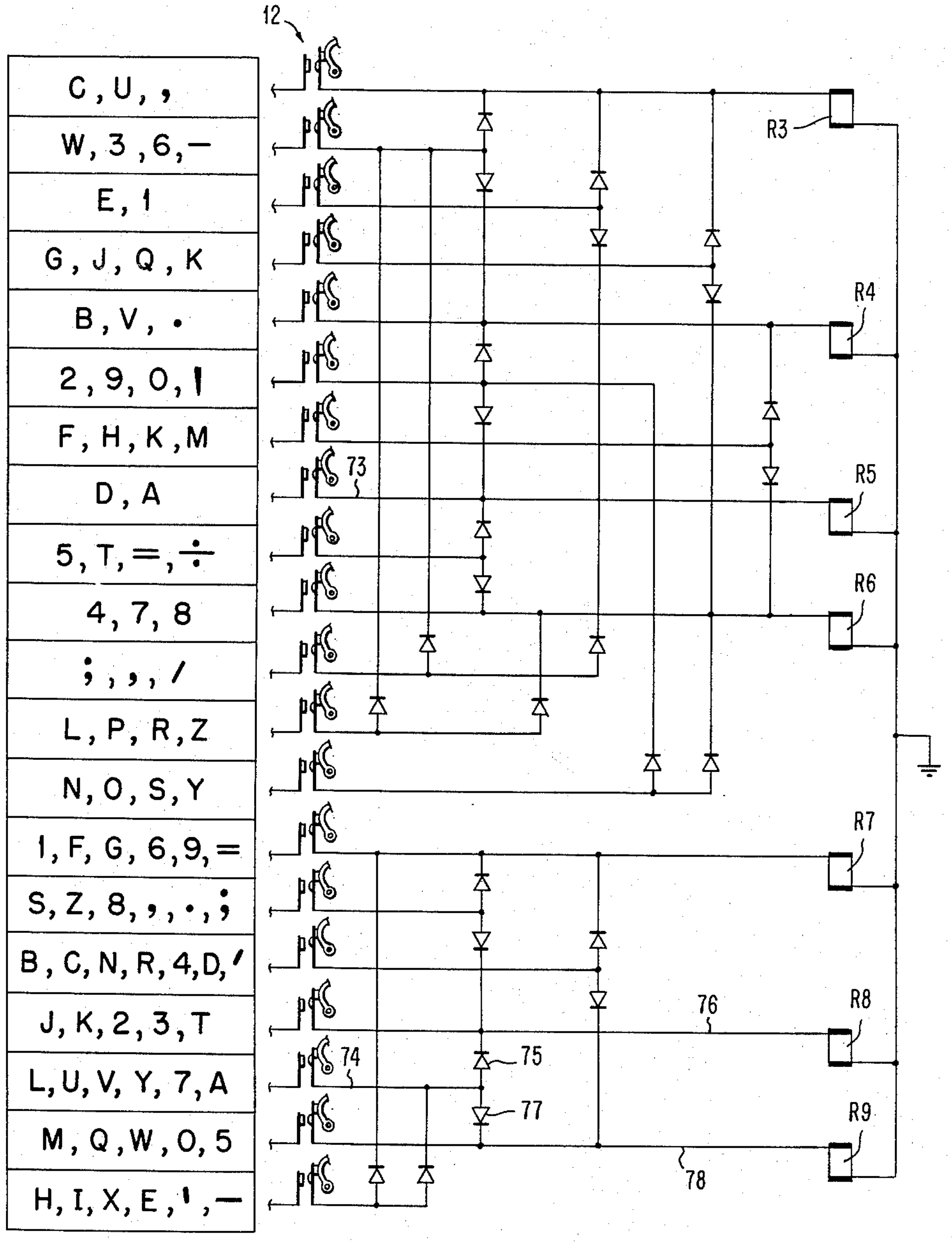
FIG. 6 is a circuit diagram indicating the combinations of relays pulsed on the actuation of different type keys.

The input conductor 126 to the matrix in FIG. 11*a* is connected, as shown in FIGS. 5*b* and 5*c* to the normally closed side of relay contacts R22*c* and to the normally open side of contacts R22*d*. The movable one of contacts R22*c* is connected through the normally closed side of shift relay contacts R12*c*, contacts R2*s* (now closed) and cam contacts 66*d* to the power source at 91. The movable one of contacts R22*d* is connected to the normally open side of contacts R12*c*.

As the head 21 is moved outwardly across the tape during a read operation, the sensing of magnetic marks causes corresponding relays R15 to R22 to be picked up. This results in a transferring of contacts in the matrix of FIG. 11 to determine a circuit through either one of the magnets 16 or one of the solenoids 112. It also results in a closing of contacts R15*a* to R22*a* for energizing hold windings of the relays picked up when the cam contacts 66*c* close. Soon after this the cam contacts 66*a* close and pick up relay R11 to cause an opening of contacts R11*d* for dropping the circuits through the pick-up windings of relays R15 to R22. The contacts R15*b* to R22*b* in the matrix 125 continue to be held transferred by their hold windings. A little later the cam contacts 66*d* close and complete a circuit from the power source 91 to the input conductor 126 leading to the matrix 125. It will be noted that the contacts R22*c* and R22*d* are transferred when the relay R22 is energized, and this takes place only when the character written on the tape is an upper case character. Assuming that the character read is of the lower case type, the contacts R22*c* and R22*d* will be in the positions shown and the closing of cam contacts 66*d* will cause a circuit to be completed through contacts R2*s* (now closed), contacts R12*c* (normally closed), contacts R22*c* (normally closed), the conductor 126 and the relay matrix 125 to energize the magnet 16 corresponding to the character sensed.

If an upper case character is read from the tape, the relay R22 is energized and causes its contacts R22*c* and R22*d* to be transferred. It also causes a solenoid 132 (FIGS. 5*b* and 12) to be energized for moving a key lever 133 downwardly to cause a shifting of the type basket from lower to upper case position. The key lever 133 and the mechanism associated therewith may be like that shown in U.S. Patent 2,517,989. Controlled by the lever 133 is a double lobed cam 134 which may be driven by the power roll 6 for shifting the type basket. A depression of the key lever releases the cam so it is driven 180° to shift the basket to upper case position. When the key lever is released, the cam is driven another 180° to return the basket to lower case position. As long as the lever is held down by the solenoid, the type basket remains in its upper case position. This solenoid is shown in FIG. 5*b* connected through relay contacts R2*b* (normally open) and contacts R22*e* (now closed) to the positive side of a voltage source. With the basket moved to its upper case position, the upper case contacts 80 (FIG. 5*a*) are closed and cause the shift relay R12 to be energized. Considerable time is required to complete the shifting of the type basket and this may sometimes not be accomplished until after the cam contacts 66*d* have opened. It is desirable, therefore, that other means be provided for energizing the print magnets when shifting to upper case position. The contacts of relay R22 transfer very soon after its pick-up winding is energized. At the time the cam contacts 66*d* close, the basket shifting is not completed and so a circuit is closed from the contacts 66*d* through contacts R2*s*, contacts R12*c* (normally closed), contacts R22*c* (normally open) and a relay R23 to ground. This relay closes its contacts R23*a* to connect the line side of contacts R12*c* to the cam contacts 66*c* which are closed when the relay R23 is picked up. If the shifting of the basket has not been completed when the cam contacts 66*d* open, the relay R23 is held energized through the contacts 66*c* and the relay contacts R23*a*. As soon as the basket is shifted the contacts R12*c* are transferred to open the circuit through the relay R23 and to complete a circuit from the contacts R23*a* through the contacts R22*d* (normally open) to the conductor 126 and the print magnets 16. To prevent an opening of the relay contacts R23*a* immediately on a breaking of the circuit through relay R23 by transferring contacts R12*c*, a condenser 135 is connected across relay R23. This holds the relay picked-up until the print magnets can be energized through contacts R23*a*.

When the type basket is in its upper case position, it is held there by the circuit through the shift contacts R12*a*, the contacts R11*a* and the contacts R2*b* (normally open) to the solenoid 132 until the sensing of the next character on the tape is completed. If the next character is also upper case, relay R22 is again picked up and closes its contacts R22*e* to provide a circuit through the solenoid 132 when the contacts R11*a* open due to an energizing of relay R11 by a closing of the cam contacts 66*a*. Contacts R22*d* also transfer and provide a circuit for energizing one of the print magnets 16 as soon as the cam contacts 66*d* close.

If the next character sensed is lower case, however, the circuit through the solenoid 132 is broken when the contacts R11*a* open, and the basket is driven again to lower case position. This takes additional time as it does when shifting to upper case position, and a circuit is needed again to energize the print magnet from the cam contacts 66*c*. At the time contacts R11*a* open and start a shifting of the basket, relay R12 is still energized and its contacts R12*c* are transferred. Since the character sensed is lower case type, the relay contacts R22*c* and R22*d* are in their normal positions. Cam contacts 66*c* are closed and a circuit exists from these contacts through relay contacts R23*a*, R12*c* (normally open), R22*d* (normally closed) and relay R23 to ground. The contacts R23*a* were closed at this time because relay R23 was picked up by cam contacts 66*d* through relay contacts R2*s*, R12*c* (normally open) and R22*d* (normally closed). When the basket reaches a point opening the contacts 80, relay R12 is deenergized and its contacts R12*c* return to normal positions completing a circuit from the cam contacts 66*c* through contacts R22*c* and conductor 126 to a print magnet 16.

If, during the reading of the tape at any character position, an even number of magnetic marks are sensed, a circuit will be completed through the matrix 125 to the error conductor 130 which is connected, as shown in FIG. 5*b*, to both grids of the thyratron 95. As described previously, the thyratron becomes conductive and effects an energizing of the error relay to stop the machine.

Assuming that a correct sensing of magnetic marks is obtained, the type bar 5 corresponding to the marks is actuated to print the character. While this operation takes places, the common contacts 14 are closed to energize the clutch magnet 27 and cause the head to move across the tape again for reading the next character. It will be understod that the tape is advanced one character space at the end of the first reading operation which was initiated by the actuation of the start key 121. From that time on, each reading operation is initiated by the energizing of the clutch magnet through the common contacts 14 which are closed by the type bar just actuated. As each reading operation is completed, the tape is stepped forwardly one character space.

Figure 4:
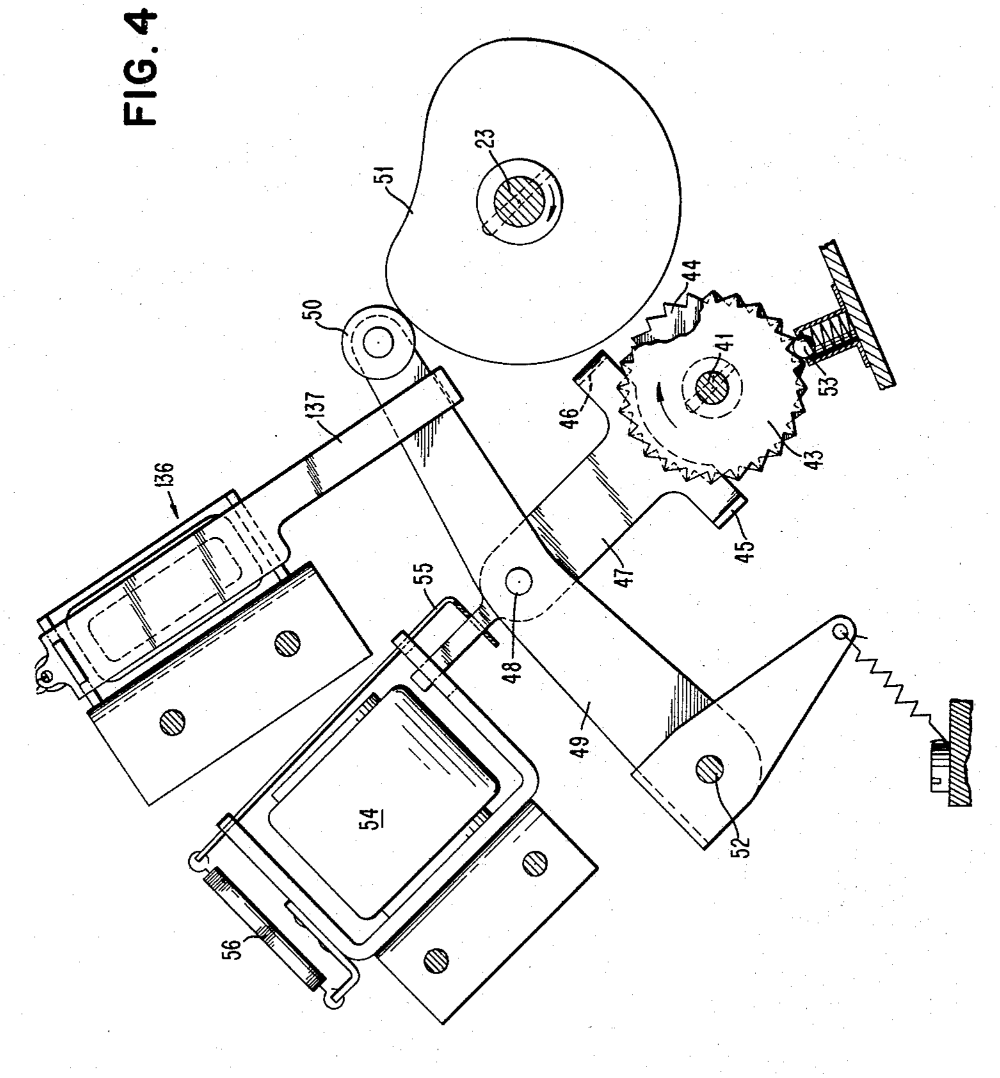
FIG. 4 is an enlarged view of the tape feeding means shown in FIG. 3.

Assume again that an even number of magnetic marks are sensed indicating an incorrect recording of a character on the tape. In this case, a circuit is completed through the conductor 130 to both grids of the thyratron 95 for making the latter conductive to energize the error relay R1. The circuit may pass through any one of the print magnets 16 or solenoids 112 in the matrix 125 controlling various functions but no typewriter operation will take place because the circuit is not grounded and no current flows to operate the magnet. The energizing of the error relay effects an opening of the contacts R1*a* as described above to stop the machine. At the same time, contacts R1*b* (FIG. 5*a*) close to complete a circuit through contacts R2*t* and a magnet 136 to ground. As shown in FIG. 4, the magnet 136 operates when energized to move a hooked arm 137 under the lever 49 (FIG. 3) for holding it from following the cam 51. This prevents a feeding of the tape 22 to keep it in step with the typewriter. Contacts R1*c* also open to prevent a starting of the machine by actuating the start key before operating the error key 97. As soon as the error key is depressed to de-energize the error relay and permit its contacts to return to normal positions, the start key may be operated to effect another reading of the same character.

Word spacing during the writing of information on tape is accomplished by depressing the usual space bar to actuate a lever like that of FIG. 13. This results in the closing of space contacts 114SP (FIG. 5*a*) to energize the clutch magnet 27 from the power source 68 through the contacts R1*a*, the contacts 114SP and a diode 140. At the same time, another circuit is completed from the contacts 114SP through contacts R2*u* to the relay R8 which is the one that must be energized, as indicated by FIG. 7, to cause the writing of a mark on the tape 22 in a position to designate a spacing function. During a reading operation, the sensing of a space mark on the tape causes a solenoid 112SP in the matrix 125 of FIG. 11 to be energized. This actuates the space bar lever to effect a spacing of the carriage.

Tabulation of the carriage is obtained by actuating a tab lever 111TB like that of FIG. 13. This closes contacts 114TB (FIG. 5*a*) to complete a circuit from the voltage source 68 through contacts R2*v* (closed during writing) and a diode 141 to the clutch magnet 27. Another circuit is completed at the same time from the contacts 114TB to the relay R3 for picking the latter to effect a writing on the tape 22. When a tab mark is sensed on the tape during reading, a solenoid 112TB is energized through the matrix 125 to actuate the lever 111TB for effecting escapement of the carriage. The mechanism actuated by this lever is like that shown in FIG. 5 of the U.S. Patent 2,717,686, mentioned above. Included with this mechanism are tab interlock contacts TBI (FIG. 5*a*) which are normally in the position shown and are operable to effect an energizing of the clutch magnet after tabulation has been completed. As described in the patent referred to, the TBI contacts are transferred as soon as tabulation starts and remain transferred as long as tabulation continues. These contacts are necessary since tabulation may not be completed in one cycle of operation and circuitry is needed to pulse the start magnet 27 for reading the next character on the tape after the carriage is stopped. The TBI contacts complete a circuit through relay contacts 25*a* and the stop switch 69 to the clutch magnet when the TBI contacts return to their normal position after energizing the relay 25 and tabulation has been completed. This will be described more completely in conjunction with carriage return operations.

Carriage return is effected by actuating a key lever 111CR like that in FIG. 13. This results in a closing of contacts 114CR (FIG. 5*a*) to complete a circuit through a diode 142 to the clutch magnet, and to complete another circuit through the relay R6 for writing on the tape. It will be noted that the circuit through contacts 114CR also includes the relay contacts R2*v* which are closed during writing but are opened when reading from the tape. The mechanism operated by the carriage return lever is like that shown in FIG. 3 of Patent 2,717,686 referred to above. Included with this mechanism are carriage return interlock contacts CRI (FIG. 5*a*) which are normally in the position shown but are transferred while the carriage is being returned. The normally open side of the CRI contacts are connected through the pick winding of a relay R25 to ground, and the normally open side of the TBI contacts are connected through normally open contacts R2*w* and the pick winding of relay R25 to ground. The normally closed side of the TBI contacts are connected through normally open contacts R25*a* and the switch 69 to the clutch magnet.

When a tab mark is sensed on the tape during reading, the solenoid 112TB is energized to actuate the tab lever for effecting tabulation. The contacts 114TB are closed but the clutch magnet 27 is not energized to start the next reading cycle because the contacts R2*v* are open. The tab interlock contacts TBI are transferred, however, to energize the pick winding of relay R25 from the voltage source 68 through the CRI contacts (normally closed). This closes the contacts R25*a* so that the clutch magnet may be energized as soon as the contacts TBI return to their normal position when tabulation has been completed. For holding the contacts R25*a* closed to energize the clutch magnet after tabulation has been completed, there is provided a hold winding for relay R25 (FIG. 5*c*) connected in a circuit from the cam contacts 66*c* through contacts R2*x* (normally open), relay contacts R25*b* (normally open) and the hold winding for relay R25 to ground. Since the cam contacts 66*c* are closed when the clutch is latched up, the hold winding for relay R25 will remain energized after the tab interlock contacts TBI transfer and complete the circuit to the clutch magnet.

The sensing of a carriage return mark on the tape causes the solenoid 112CR to be energized for actuating the lever 111CR to effect a return of the carriage. Contacts 114CR are closed, but are not effective to energize the clutch magnet since the contacts R2*v* are open. The carriage return interlock contacts CRI are transferred and energize the pick winding of relay R25. As soon as return of the carriage has been completed, the contacts CRI return to their normal position and complete a circuit from the voltage source 68 through relay contacts R1A, contacts CRI (normally closed), contacts TBI (normally closed) and relay contacts R25*a* to the clutch magnet. This operates the clutch to start another reading cycle.

There has been described a mechanism co-operating with a typewriter to write magnetic marks on a tape representative of characters or functions obtained by the actuation of type keys. This mechanism includes a magnetic head which moves across the tape, erasing information that may have been previously written and then writing information corresponding to the key actuated. The head then moves back across the tape reading the information just written to test it for accuracy, and locking the machine when an error is detected. After the tape has been prepared, the same magnetic head is caused to move back and forth across the tape to read the information and operate the typewriter for writing the information.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the claims.

What is claimed is:

1. Apparatus for selectively recording information bits in sequence in a plurality of data channels on an elongated storage medium concurrently with the typing of characters on a typewriter and the performance of certain functions during individual successive cycles of operation of said typewriter, comprising:

transducer means;

means operable during each cycle of operation for reciprocating said transducer means outwardly from a home position in a first direction transversely across said storage medium and then inwardly toward said home position in an opposite direction;

pulse generating means operable to supply a series of impulses at timed intervals corresponding to the times at which said transducer encounters the respective data channels during its outward movement;

recording circuit means operable during said outward transverse movement for activating said transducer by said impulses in a selective manner in order to record in sequence individual data bit signals having a predetermined parity and also having a particular configuration which represents the character typed or function performed by said typewriter, as the case may be;

and checking circuit means operable during the inward transverse movement of said transducer in response to signals derived by said transducer from said data bit representations for determining the correctness of parity of said group of signals with respect to said predetermined parity.

2. The apparatus as set forth in claim 1 wherein said elongated storage medium is a magnetic tape, wherein said transducer is a magnetic read/write head, and wherein means are provided which are operable during each cycle of operation to feed said magnetic tape into position for recording a succeeding group of data bit signals.

3. The apparatus as set forth in claim 1 wherein said record circuit means is operable to develop an odd number of bits in each group recorded, and wherein said checking circuit means is operable to provide an indication of an error whenever an even number of bits is sensed in any data group.

4. The apparatus as set forth in claim 1 wherein said record circuit means is set up in a selective manner in response to individual key depressions, and wherein operation of said reciprocating means is initiated in response to depression of any of said keys.

5. The apparatus as set forth in claim 1 which further comprises:

means for selectively changing the mode of said apparatus from a record to a read status;

means operable when said apparatus is in a read status for automatically initiating and continuing successive cycles of operation in order to reciprocate said transducer transversely outwardly and inwardly across said storage medium for the purpose of extracting previously recorded information;

read circuit means operable in conjunction with said pulse generating means during the outward movement of said transducer for deriving data representing signals from said storage medium;

and means for actuating said typewriter under control of the signals derived by said read circuit means.

6. The apparatus as set forth in claim 5 which further comprises:

an encoding circuit for developing the individual data bit group configurations to be recorded in response to each typewriter key depression;

a decoding circuit for developing individual character and operational selecting signals in response to the data bit groups read from said storage medium during a read operation;

and wherein said checking circuit means is selectively operable directly from signals derived by said transducer during a record check operation, or by signals supplied by said decoding network during a read operation.

7. The apparatus as set forth in claim 6 wherein the means for generating pulses during a recording and a reading operation includes a plurality of emitters corresponding in number to the number of data channels in said storage medium and wherein said reciprocating means includes elements movable past said emitters in a synchronized manner with respect to said reciprocation so that the required series of impulses is supplied by said emitters at the times required for said recording and reading operations.

References Cited in the file of this patent

UNITED STATES PATENTS

| | | |
|---|---|---|
| 2,687,199 | Goodale et al. | Aug. 24, 1954 |
| 2,827,623 | Ainsworth | Mar. 18, 1958 |
| 2,860,756 | Wilson et al. | Nov. 18, 1958 |
| 2,901,734 | Welsh et al. | Aug. 25, 1959 |
| 2,904,776 | Neff | Sept. 15, 1959 |